United States Patent [19]
Jacobson et al.

[11] 3,918,778
[45] Nov. 11, 1975

[54] DYNAMICALLY BALANCED BEARING ASSEMBLY

[75] Inventors: Peter E. Jacobson, Phoenix; Robert L. Pirman, Scottsdale, both of Ariz.

[73] Assignee: Sperry Rand Corporation, New York, N.Y.

[22] Filed: June 5, 1974

[21] Appl. No.: 476,635

[52] U.S. Cl. .............................................. 308/201
[51] Int. Cl. ......................................... F16c 33/38
[58] Field of Search ..................... 308/188, 201, 217

[56] References Cited
UNITED STATES PATENTS

| | | | |
|---|---|---|---|
| 3,212,834 | 10/1965 | Mayer et al. | 308/188 X |
| 3,429,626 | 2/1969 | Teufel | 308/201 X |
| 3,744,862 | 7/1973 | Schwartz | 308/201 |

*Primary Examiner*—M. Henson Wood, Jr.
*Assistant Examiner*—Michael Mar
*Attorney, Agent, or Firm*—Howard P. Terry

[57] ABSTRACT

A ball bearing assembly is disclosed wherein dynamic and inertial force unbalances and variations inherent in conventional bearings produced by inconsistent ball-to-cage and cage-to-land contact forces resulting in bearing instability and vibration are compensated by configuring the ball cage such that the relative mass positions of the balls and the cage are predetermined, maintained constant and are compensated within the rotating system whereby the radial inertial forces are rendered predictable and constant in direction and magnitude resulting in balanced and stable bearing performance free of vibrations transmitted therefrom to the bearing support or supported members and free of dynamic cage instabilities.

12 Claims, 12 Drawing Figures

DYNAMICALLY BALANCED BEARING ASSEMBLY

BACKGROUND OF THE INVENTION

1. Field of the Invention

The present invention relates to anti-friction bearings and more particularly to bearings of the type having a plurality of rolling elements rolling between cooperating rings or races, such as a ball bearing. More specifically, the invention pertains to the design configuration of the ball retainer or ball cage of a ball bearing, particularly of the angular contact, preloaded type, which significantly improves ball bearing dynamic performance and increases bearing life. The improved ball bearing of the present invention is ideally suited to a myriad of applications requiring extreme stability and quiet operation, mechanically as well as audibly as well as freedom from vibratory forces at cage rotational frequency. One such application is in high speed precision instruments such as, for example, gyroscopes. Its unique design renders the bearing very desirable in zero g environments such as in satellite stabilizing gyroscopes where freedom from dynamic instability and attendant vibrations over many years of life is a requirement.

2. Description of the Prior Art

In applications involving moderate to high speed operation, ball bearings of the preloaded angular contact type are generally used. The conventional ball separator or cage for such a bearing is usually a right cylinder having ball pockets symmetrically arranged in the walls thereof and fabricated from any suitable material, for example, a linen-base phenolic, a sintered (oil reservoir) material such as polyimide, a sintered or solid metallic alloy, etc. In the past these ball retainers or cages have been free floating between the bearing race lands and attempts have been made to reduce bearing instability by reducing the ball-to-cage clearances, shaping the ball pockets or reducing the lubricanat viscosity. However, the reduced clearances have resulted in increased dynamic torque loads and the reduced lubricant viscosity often results in reduction in bearing life. Thus, no existing techniques are known for consistently reducing or eliminating dynamic unbalances in the bearing and vibrations transmitted to the outside therefrom. The most significant source of induced dynamic instability and bearing vibration is the ball-cage dynamics - i.e., the radial inertial forces developed by the ball and cage dynamics.

SUMMARY OF THE INVENTION

Thus, it is the primary object of the invention to provide a ball bearing assembly that is quiet, dynamically stable and free of vibrational force transmitted from the bearing to its support structure.

It is a further object of the invention to configure the ball retainer ring or cage, in terms of its mass distribution and ball pocket locations, such that the cage inherently assumes a stable whirl mode with all ball-to-pocket and cage-to-land forces predictable and constant thereby assuring stable and substantially vibrationless operation.

These and other objects are accomplished by forming the cage with a mass eccentricity relative to the bearing rotational axis whereby in operation, a radial centrifugal force on the cage causes it to radially shift so that the cage contacts a bearing race land and establishes a predictable whirl pattern. Additionally, the cage is further shaped so as to produce a further unbalance moment about a diametral axis normal to the radial centrifugal force vector to thereby create a loading on the balls in the direction of the bearing rotational axis which stabilizes the ball positions in their pockets predetermining the ball-to-pocket contact points. This unbalance may be enhanced by machining a wall of the cage so that the cage contacts only one of the race lands thereby creating a lever arm between this contact point and the cage center of gravity.

The ball pockets are formed in the cage such that their respective axes intersect at the cage rotation axis thereby to further reduce ball-to-pocket coupling forces and allow the cage to shift axially under the noted centrifugal force and minimize force coupling between the balls and pocket walls. Further, certain of the ball pockets are angularly shifted relative to the bearing rotational axis so that their ball-to-pocket contact forces produce radial inertial forces which balance the cage unbalance forces whereby to reduce or eliminate any vibrations from the bearing assembly to its support structure. In other words, the bearing's radial force polygon is controllable and consistent and always closes on itself, thereby assuring a near zero resultant inertial force being transferred to the outside frame to which the bearing is attached.

All of the foregoing configurations may not be required for improved bearing operation and the selection or combination of these configurations will depend upon a number of considerations such as the size of the bearing assembly, its normal speed of operation, the degree of "quietness" and/or stability desired, the presence or absence of gravity, and the like.

BRIEF DESCRIPTION OF THE DRAWINGS

FIG. 1 and the figures to follow illustrate a bearing employing eight balls, but the concepts are applicable to other numbers of balls as well.

DESCRIPTION OF THE PREFERRED EMBODIMENT

Figures 1, 10A, 10B, 10C:
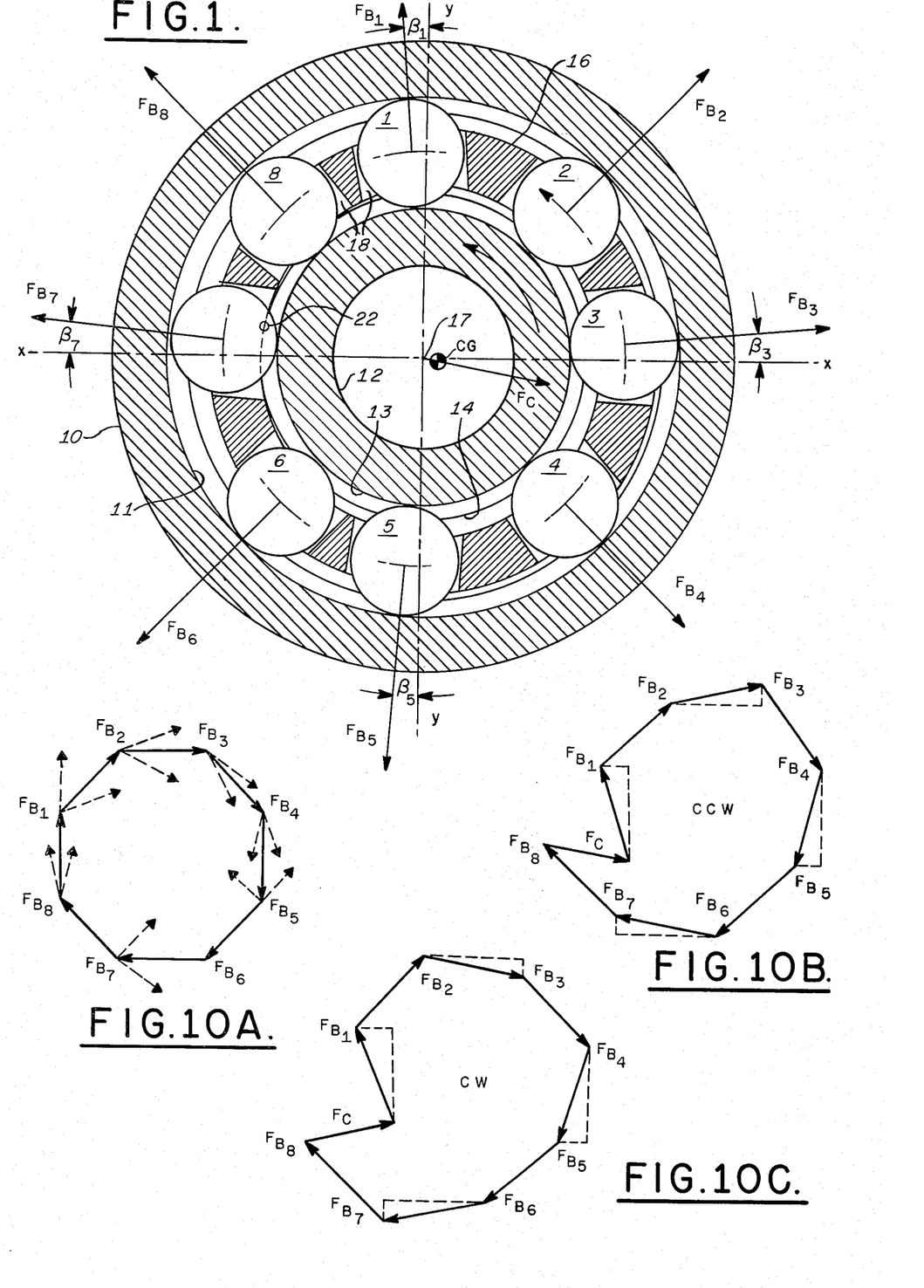
FIG. 1 is a transverse cross-sectional view of a typical ball bearing assembly incorporating the teachings of the present invention.
FIGS. 10A, 10B and 10C are typical radial force vector diagrams of an eight ball bearing useful in explaining the principles of the present invention.

Referring now to FIG. 1, there is illustrated a bearing assembly embodying the teachings of the present invention. This particular embodiment is a ball bearing assembly of the preloaded, angular contact type usually employed for supporting a shaft or other rotatable member (not shown) for moderate to high speed rotation about a support axis in a relatively fixed support structure (also not shown). The primary elements of the ball bearing assembly comprise an outer race ring 10 having an internal annular groove or raceway 11 (of the conventional open or closed type) and adapted to be supported in a suitable bore of the fixed support structure; an inner race ring 12, having an external annular raceway or groove 13 defining inner race land surfaces 14, 15 (see FIG. 3); a plurality of balls 1 through 8, sometimes referred to as the ball complement and a retainer ring or cage 16 which serves generally as a ball separator. The inner race ring 12 is adapted to support a shaft or trunnion (not shown for clarity) of a member to be supported by the bearing assembly for rotation about the bearing axis 17. The bearing assembly of FIG. 1 will, in most applications, cooperate with one or more identical bearing assemblies to provide full support for the rotatable member. The bearings, in use, are normally preloaded so that the ball-to-race contact angle $\alpha$ (FIG. 3) is maintained substantially constant. The improved bearing assembly of the present invention obviously has a myriad of applications particularly where quietness of operation is important or desirable. By quietness of operation is meant substantially zero mechanical and/or audible vibrations emanating from the bearing assembly. This requires extremely delicately and controllably balanced forces within the bearing itself. One such application is in gyroscopics, particularly the bearings which support the high speed gyroscope rotor in its rotor case. More specifically, such quietness of operation of ball bearings is very desirable in space vehicle gyroscopes. One such application would be the duplex pairs of gyro rotor spin bearings shown in Applicant's Assignee's U.S. Pat. No. 3,742,769.

If a ball bearing could be manufactured so that the dimensions of all of its critical parts were absolutely perfect, i.e., the balls and races were incompressible and geometrically perfect, their contacts were simple point contacts and the bearing operated with no external influences, e.g. zero g, no lubrication, etc., then the ball complement could be initially symmetrically spaced about the bearing axis and the individual balls would simply roll within their race grooves never changing their relative positions. No ball retainer or cage would be required. In such a perfect bearing all of the ball radial inertial force vectors (e.g. $F_{B_1} - F_{B_8}$ of FIG. 1) would be identical and symmetrical; and if these vectors were arranged in the form of a polygon, the bearing radial inertial force polygon would appear perfectly symmetrical, as shown in FIG. 10A for an eight ball complement bearing. All radial inertial forces would be balanced and the bearing would operate in a noiseless manner, i.e., emanating no vibrations to its support or supported structure.

Of course, such a perfect bearing cannot be made using currently available manufacturing technology and ball bearings do not operate isolated from external influences. For example, the balls are not identical in dimension or roundness, the races are not perfectly smooth and circular, the normal bearing loads prevent point contact between ball and races, lubricants introduce ball skidding at the rolling contact, etc., etc. All of these and other factors contribute to the requirement for a ball separator, usually referred to as a ball retainer or cage. The addition of a ball retainer further contributes to the generation of unbalanced radial inertial forces resulting in vibrations emanating from the bearing assembly. The ball retainer may also be dynamically unstable due to inconsistent ball and cage contact points. For example, the same manufacturing or fabrication limitations can result in erratic dynamics of the cage while clearances between the cage ball-pocket walls and balls, required for free ball and cage rotation, together with the above factors, results in random motion and forces between balls and pockets as well as cage and lands; all contributing to uncontrolled variations and/or oscillations in the mass positions of each of the balls and cage, or both, at any instant thereby producing non-uniform radial inertial forces and rotational dynamics. As suggested by the dashed vectors of FIG. 10A, these random and unpredictable forces cause the force polygon to "open" which, by definition, results in random radial inertial forces being imparted to the bearing support structure.

In accordance with the teachings of the present invention, the ball bearing assembly, and particularly the ball cage, has been designed so that at any instant the total set of radial inertial force vectors produced by the balls and cage are controllable in direction and magnitude so that the resulting force polygon may be closed and no random or uncontrolled radial inertial forces developed. Basically, this result is accomplished by configuring the ball cage so that it develops forces which will, in effect, capture or lock the position of each ball relative to its ball pocket, i.e., the mass position of each ball is known and constant within the rotating system of individual elements of the bearing assembly.

Figure 2:
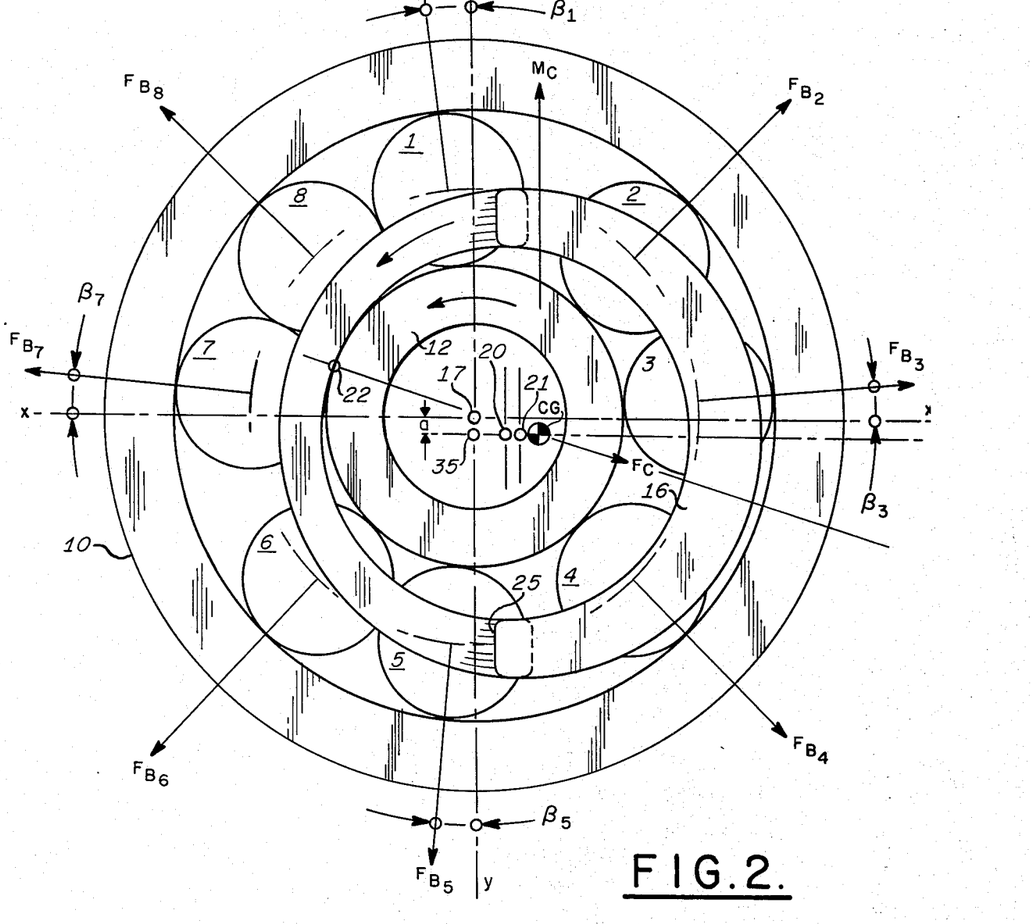
FIGS. 2 and 3 are generally schematic views of the bearing of FIG. 1 in which the bearing cage dimensions have been exaggerated to better illustrate the mass eccentricity and resulting radial and diametral angular offset thereof.
Figure 3:
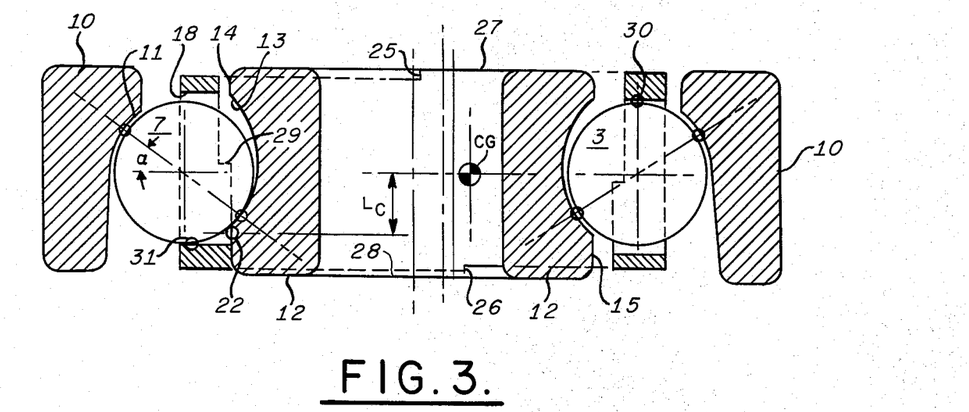
Figure 4:
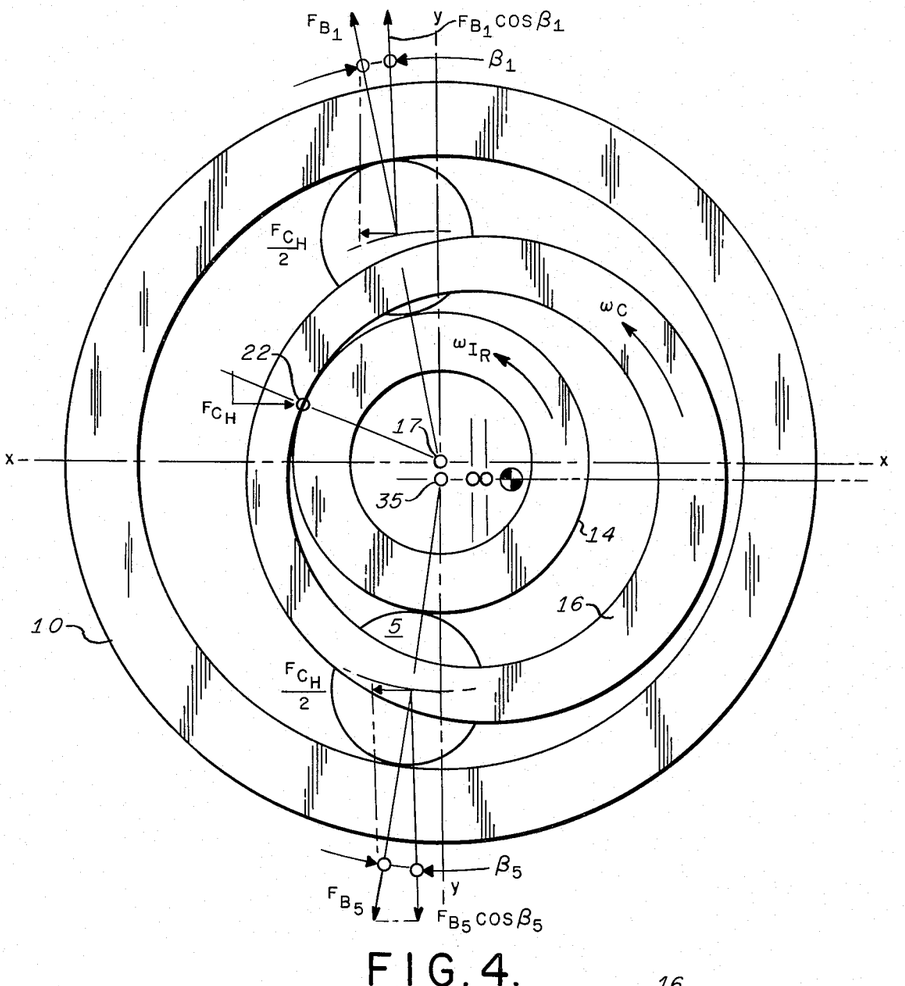
FIGS. 4 and 5 are views similar to FIGS. 2 and 3, respectively, illustrating the offset of certain ball pockets to dynamically balance the cage radial eccentricity.
Figure 5:
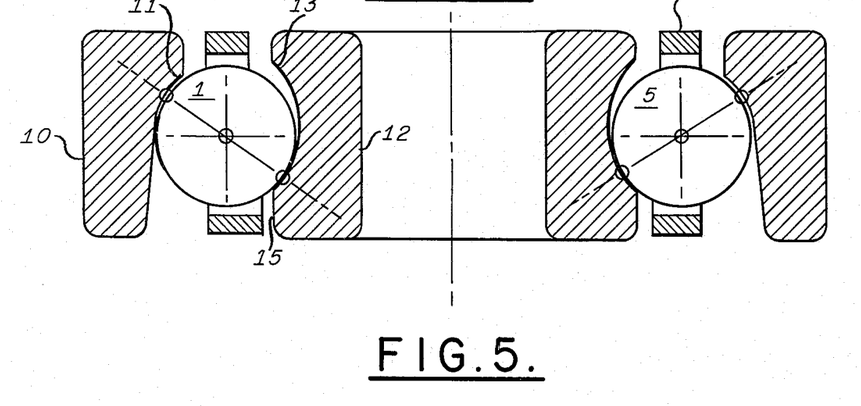

Referring again to FIG. 1 and also to FIGS. 2 and 3, the ball cage 16 is designed to produce a radial centrifugal force $F_c$ by providing a mass unbalance or mass eccentricity of the cage about the bearing axis 17. This force may be produced in a number of ways such as by simply adding a point mass to a side wall of the cage, or, as illustrated in the present preferred embodiment, by machining the cage such that its center of gravity lies eccentric to the axis 17, for example as by machining the cage with its inner diameter axis 20 and its outer diameter axis 21 offset to thereby form an eccentric cylinder. This will place its mass center of gravity, CG, when assembled in the bearing, displaced from the bearing axis 17 as shown in exaggerated dimension in FIGS. 2 and 3, but in a little more realistic magnitude in FIG. 1. Thus, when the inner race ring 12 is rotated, centrifugal force will cause the cage to be radially displaced and one of the cage walls will contact one of the inner or outer race lands depending on whether the cage is designed to be inner race riding or outer race riding; the basic concepts and principles of the invention will apply to either configuration. Referring to FIGS. 2 and 3, the cage 16 will be radially displaced and the thinner inner wall thereof will contact the land 15 at a contact point 22 thereof. The radial inertial force $F_c$ resulting from the now orbiting cage mass about the bearing rotation center 17 will be generated. The magnitude of this force, controlled by the amount of eccentricity of the cage, must be large enough at some designed or predetermined cage speed to overcome all ball-to-pocket forces, that is, it must be greater than any circumferential or radial force which may be produced between the ball pocket walls and ball contacts. FIG. 2 illustrates an exaggerated cage orientation after the cage radial displacement has occurred. This figure also illustrates and identifies each of the ball radial inertial force vectors $F_{B_1}$ through $F_{B_8}$ together with the cage radial inertial force vector $F_c$.

In order further to reduce any ball-to-pocket circumferential forces, the ball pockets are machined in the cage with their respective axes intersecting the anticipated bearing rotation axis as shown in FIG. 1, i.e., the ball pockets are machined so that their centers intersect the bearing axis 17, after the cage has been radially displaced; although this axis may not be the final cage rotation axis since it may be displaced slightly from the exact bearing axis 17 for reasons to be described below. In this connection, the positions of the cage and balls shown in all of the figures are the final or ultimate positions and the forces and purposes establishing these positions will also be described below.

While the mass eccentricity of the ball cage producing the centrifugal cage force $F_c$ and the resultant radial displacement of the ball cage, together with the ball pocket axes intersecting at the bearing axis serves to greatly reduce any radial inertial force inconsistencies especially if the bearing is to operate under the force of gravity, further improvement is possible and indeed desirable in many applications. This is bacause the radial cage shift alone does not accurately or precisely locate each ball mass center relative to their ball pockets and their associated inertial force vectors $F_{B_1}$ to $F_{B_2}$. For example, in FIGS. 1 and 2, the ball pockets for balls 3 and 7 lie generally in line with the direction of cage radial displacement and hence are not positively captured. To more accurately locate the ball mass centers relative to the cage, an additional force on the balls is required, this force being in a direction jointly normal to the cage spin axis and cage centrifugal force vector $F_c$ (before its being slightly angularly shifted for reasons which will become apparent as the description proceeds). For this purpose, a further eccentricity is imparted to the cage by unbalancing it about a cage diametral axis normal to the cage centrifugal force, that is, normal to the direction of said cage offset diameters, and thereby introduce an overturning moment $M_c$ on the cage (FIG. 2). This additional eccentricity or cage unbalance may also be provided in a number of ways, for example, by adding point masses near the top and bottom surfaces of the cage on a diameter thereof parallel with the first mentioned eccentricity diameter. In the preferred embodiment illustrated, this further cage eccentricity is provided by forming or machining steps 25, 26 in the cage faces 27, 28, respectively, as shown in FIGS. 2 and 3, i.e, by removing mass from the top and bottom cage faces 27, 28 as shown. This overturning moment $M_c$ in FIG. 2, may be augmented by relieving the upper portion of the inner circumference of the cage as shown at 29 in FIG. 3, which increases the upper inner diameter of the cage. This relief causes the point of contact between the cage inner surface and the inner bearing race 12 to be located only on the lower land 15 of the inner race thereby creating a further overturning moment by the product of the cage inertial force $F_c$ and the lever arm or overturning arm $L_c$.

The thus created overturning moment tilts the cage 16 such that the upper wall of the ball pocket for ball 3 contacts the upper surface of ball 3, approximately at point 30 in FIG. 3, and the lower wall of the ball pocket for ball 7 contacts the lower surface of ball 7, approximately at point 31. An almost identical action occurs between the ball pockets for balls 2 and 4 and between the ball pockets for balls 6 and 8, respectively. Thus, the additional cage loading produced by the overturning moment further captures and accurately locates these balls in their respective pockets. This overturning moment feature which precisely locates the bearing balls by cage unbalance alone is especially useful in bearings which are to operate in a zero g environment, such as in satellite or other space vehicle applications, where inertial tuning of the force polygon is desired to reduce external resultant forces and where improved dynamic cage stability is desired.

It will be noted by inspection of FIGS. 2 and 3, however, that when, in operation, these contacts occur, additional forces are imparted to the cage by the rotation of the involved balls, i.e., by their rotation as they roll between the bearing races within the ball pockets and by the rotating inner race land at the contact point 22. For the counterclockwise rotation illustrated in FIGS. 2 and 3, these frictional forces, primarily from balls 3 and 7, and to a lesser degree from balls 2, 4 and 6, 8 as well as from the contact at the inner race land at point 22 tend to translate or displace the cage in the direction parallel to the overturning moment $M_c$ or downwardly in FIG. 2, the displacement, $a$, being shown somewhat exaggerated in this figure. This further cage displacement also tends to angularly shift the cage/land contact point 22 and its resultant centrifugal force vector $F_c$ as referred to above. Now that the cage position can be accurately determined, the ball pocket axes center 35 may also be precisely determined.

Having precisely determined or predicted the ball cage and ball complement positions, the individual balls may now be shifted out of symmetrical circumferential position in a manner to force compensate the total system resulting in a minimum external resultant inertial force; i.e., to ensure that the bearing force polygon always closes on itself as shown in FIGS. 10B and 10C for counterclockwise and clockwise bearing rotation respectively. The precise determination of these circumferential ball positions will now be described, reference being made to FIGS. 4, 5 and 6, 7 wherein only the effected balls are illustrated for simplicity and clarity.

The cage radial inertial force vector $F_c$ acts on inner race ring 12 at point 22 and produces a cage unbalance force which unless compensated would be transmitted to the bearing support structure through the balls resulting in undesired external vibrations. It will be noted that this vector imparts force components in two orthogonal directions due to the radial cage displacement along the moment vector $M_c$ produced by the overturning moment $M_c$ as described above. As illustrated in the figures, one will be referred to as a horizontal component, $F_{c_H}$, due to the horizontal radial displacement of the cage and the other the vertical component, $F_{c_V}$, due to the vertical displacement, $a$, of the cage. The horizontal component $F_{c_H}$ is of a predetermined magnitude and is compensated or balanced out by moving balls 1 and 5 circumferentially away from the diametral axis y—y by an amount such as to produce a pair of small, horizontal components from the radial inertial force vectors $F_{B_1}$ and $F_{B_5}$ of these balls. Since the horizontal component $F_{c_H}$ is to the right of the assembly axis y—y, these balls are displaced to the left of this y—y axis. The offset angles are $\beta_1$ and $\beta_5$ and are determined from the following relation, $$F_{c_H} = F_{B_1} \sin \beta_1 + F_{B_5} \sin \beta_5$$

or $$F_{c_H}/2 = F_{B_1} \sin \beta_1 = F_{B_5} \sin \beta_5$$

so that knowing the magnitude of the required compensating force vectors which must be produced by balls 1 and 5, i.e., the magnitude $F_{c_H}/2$, the angular offset angles $\beta_1$ and $\beta_5$ of ball pockets 1 and 5 may be determined using the above relationship. Thus, the radial inertial force vector component $F_{c_H}$ produced by the eccentric cage mass is compensated by the pair of equal and opposite force vectors $F_{c_H}/2$ produced by the offset ball pockets for balls 1 and 5. It will also be noticed that $$F_{B_1} \cos \beta_1 = F_{B_5} \cos \beta_5$$

so that there is no unbalance of the radial inertial forces of balls 1 and 5. Graphically, this force compensation is shown in FIGS. 10B and 10C wherein the inertial force vectors $F_{B_1}$ and $F_{B_5}$ are slightly angularly displaced to maintain a closed force polygon.

Figures 6, 7:
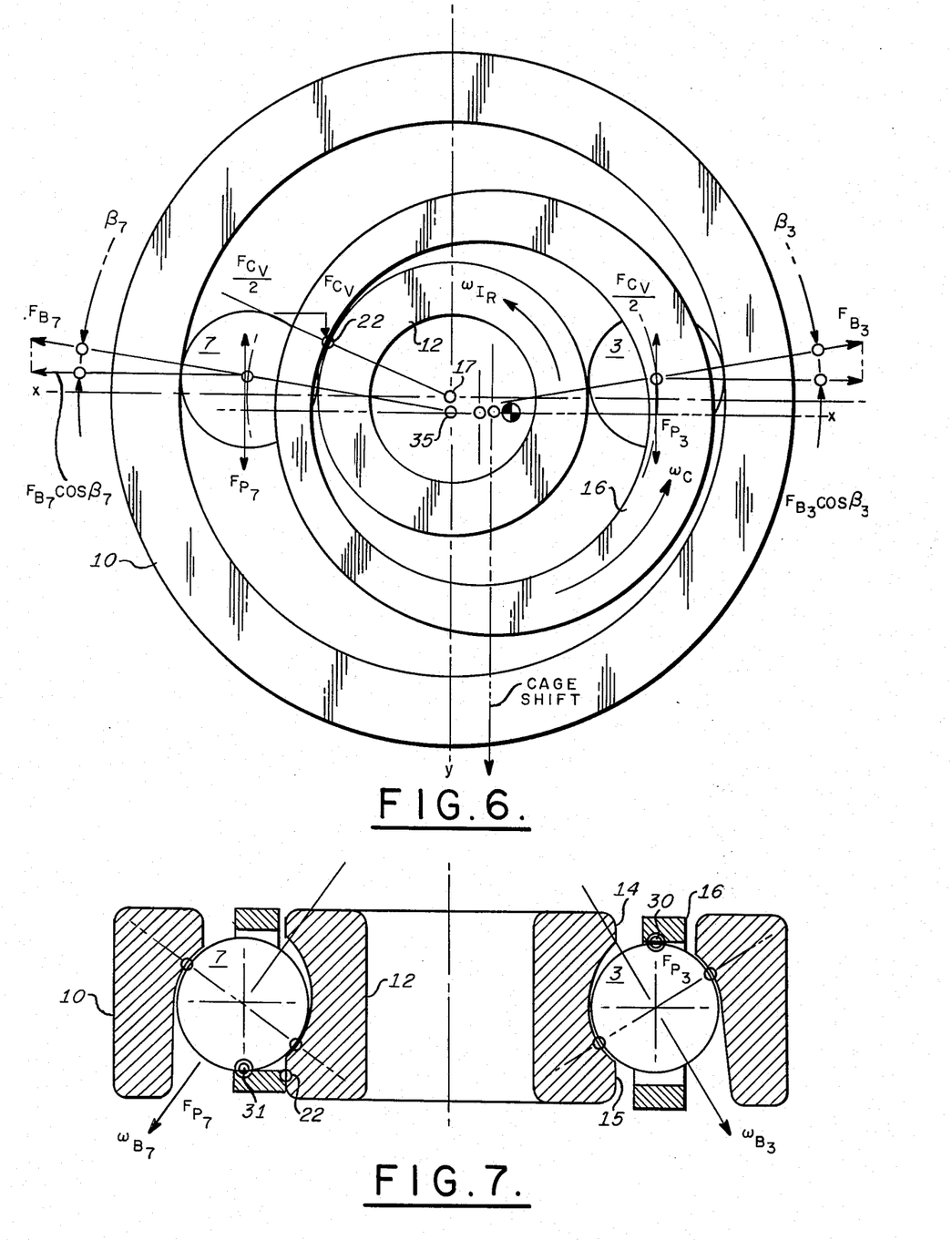
FIGS. 6 and 7 are similar views illustrating the offset of certain other ball pockets to dynamically balance the cage radial eccentricity normal to that shown in FIG. 4.

The vertical component $F_{c_V}$ of the cage centrifugal force vector $F_c$ is compensated in a similar manner, reference being made to FIGS. 6 and 7. As stated above, this vector component is produced by radial displacement of the cage in the vertical direction as viewed in the figures, this displacement resulting from the effects of the rotating or angular velocity $\omega$ of balls 2, 3, 4, 6, 7 and 8 and the inner race ring land contact 22. Only balls 3 and 7 are shown for clarity and the compensation may be effected through shifting only these balls. However, as will be explained below, the effects of the shifted cage on balls 2, 4, 6 and 8 must be taken into consideration when calculating the shift of balls 1, 3, 5 and 7. The downward shift of the cage is produced by force vectors $F_P$ and $F_{P7}$ as shown in FIG. 6, this direction of shift being for a counterclockwise rotation of the bearing. They will, of course, reverse in direction for a clockwise cage rotation. As before, the compensating forces are derived from the radial inertial forces of balls 3 and 7 as represented by their respective vectors $F_{B_3}$ and $F_{B_7}$. The offset angles are $\beta_3$ and $\beta_7$ and are determined from the following expression $$F_{c_V} = F_{B_3} \sin \beta_3 + F_{B_7} \sin \beta_7$$

or $$F_{c_V}/2 = F_{B_3} \sin \beta_3 = F_{B_7} \sin \beta_7$$

Again, note that $$F_{B_3} \cos \beta_3 = F_{B_7} \cos \beta_7.$$

Thus, knowing the magnitude of the ball radial inertial force vector $F_{c_V}$ required to effect the desired compensation, the angular offset angles $\beta_3$ and $\beta_7$ may be determined using the above relationship. Again, this force compensation is shown graphically in FIGS. 10B and 10C wherein the force vectors $F_{B_3}$ and $F_{B_7}$ are slightly angularly displaced for clockwise and counterclockwise rotations respectively to maintain a closed bearing force polygon.

Figure 8:
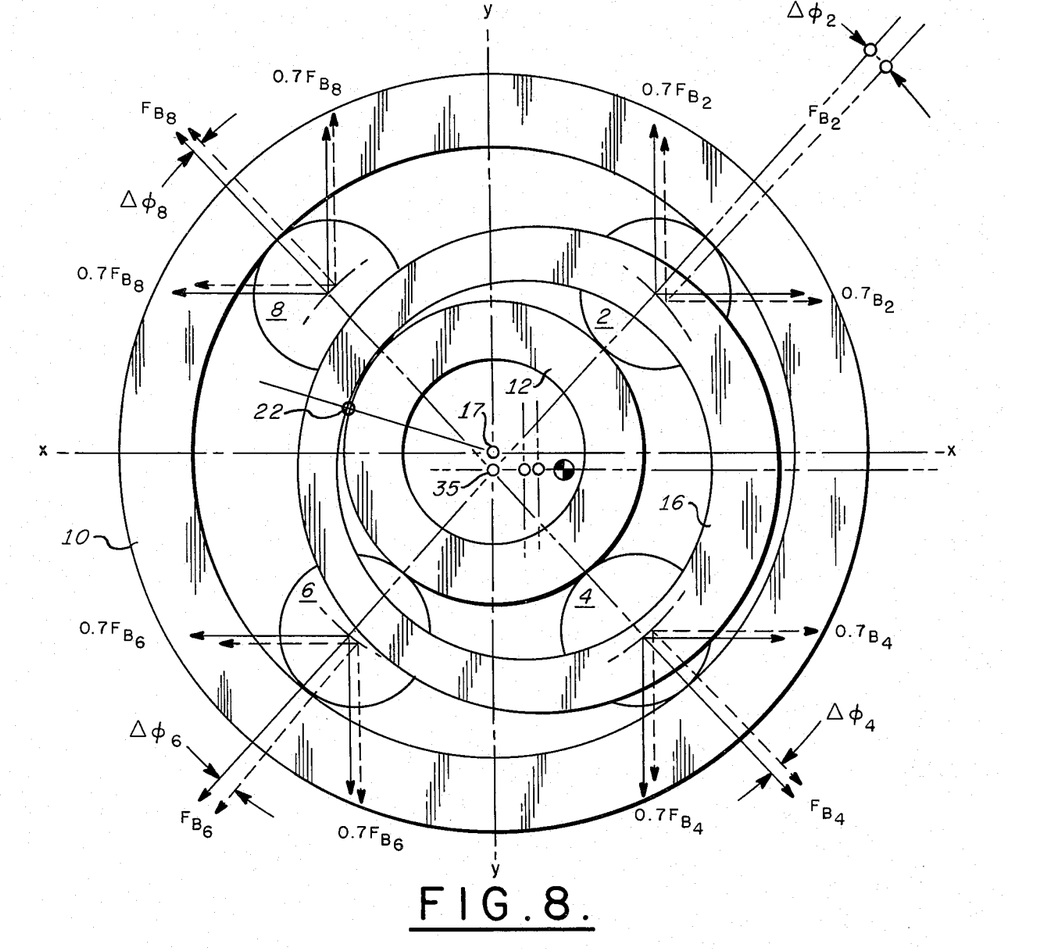
FIGS. 8 and 9 are similar views showing the near self-compensating effects of the cage eccentricities due to the remaining ball set.
Figure 9:
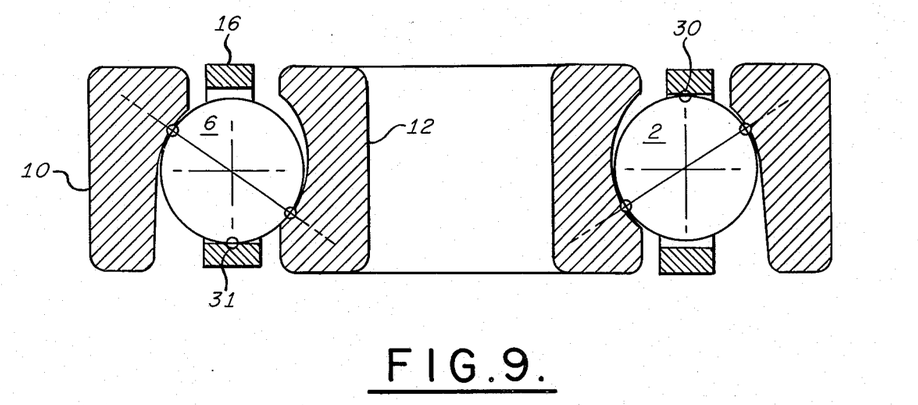

It will be evident from FIGS. 8 and 9 that balls 2, 4, 6 and 8 will shift out of position as a result of the two components of cage shift produced by the inertial force components $F_{c_H}$ and $F_{c_V}$. This cage shift unbalances the radial inertial force vectors $F_{B_2}$, $F_{B_4}$, $F_{B_6}$ and $F_{B_8}$ and their resultant forces are included in the calculation of the offset angles $\beta_1$, $\beta_3$, $\beta_5$ and $\beta_7$. The shift of these primary ball inertial force vector positions is related to the angles $\Delta\phi_2$, $\Delta\phi_4$, $\Delta\phi_6$ and $\Delta\phi_8$ and the following relations may be used to calculate their respective compensating forces, assuming $+\Sigma F_H$ is to the right and $+\Sigma F_r$ is upward as viewed in FIG. 8 and subscripts R and L designate right and left, respectively.

$$\Sigma F_H = F_{B_2} \cos(45 - \Delta\phi_2) + F_{B_4} \cos(45 - \Delta\phi_4) - F_{B_6} \cos(45 + \Delta\phi_6) - F_{B_8} \cos(45 + \Delta\phi_8)$$

If $$F_{B_2} = F_{B_4} = F_{B_6} = F_{B_8} = F_B;$$

$$\Delta\phi_2 = \Delta\phi_4 = \Delta\phi_R \text{ and } \Delta\phi_6 = \Delta\phi_8 = \Delta\phi_L \Sigma_{FH} = 2F_B \cos(45 - \Delta\phi_R) - 2F_B \cos(45 + \Delta\phi_L)$$

If the displacement is small (i.e. < 0.010 inches)

$$\Delta\phi_R = \Delta\phi_L = \Delta\phi\theta$$

and $$\Sigma F_H = 2F_B [\cos(45 - \Delta\phi) - \cos(45 + \Delta\phi)] = 2.83 F_B \sin \Delta\phi$$

In a similar manner it may be shown that $$\Sigma F_V = 2.83 F_B \sin \Delta\phi$$

Although these relationships and the principles of operation are described for an eight-ball bearing complement the concepts are the same for any number of balls.

In the foregoing a fully dynamically compensated ball bearing has been described wherein the ball cage is configured such that the mass positions of all of the balls and the cage are known and constant and wherein the circumferential ball positions are such that the radial inertial forces of the balls and the cage are all balanced whereby in operation the bearing assembly is not a source of or does not emanate vibrations to the support or supported structure. The foregoing features also provide for greatly improved dynamic stability of the bearing. The primary source of dynamic instability is the whirl characteristic of the ball cage and is nearly always present in conventional ball bearings of the type disclosed herein but may not always be noticeable or audible. Ball cage instability is almost always present when the ball-to-pocket contact forces and/or cage to race land contact forces are not consistent. For example, a near dormant instability can suddenly become manifest by reason of a small change in lubricant distribution which alters these contact forces. If a large instability is allowed to persist for any length of time, the resultant cage-land impact loads and ball skidding can result in premature failure of the bearing, higher torque and undesirable vibration characteristics.

It will be recognized that many of the features of the dynamically balanced bearing described above result in greatly improved ball-pocket and cage-land contact characteristics and therefore these same features contribute to a greatly improved bearing dynamic stability. The feature contributing most to improved dynamic stability is the mass eccentric ball separator or cage. However, some of the remaining cage design features may or may not be required depending upon bearing size and operating environment. For example, the cage axial face steps 25 and 26 which produce the overturning moment may not be required in very small bearings but will substantially always be required in larger bearings and especially in bearings operating in a zero g environment such as in space. Also, if the bearing is very small, the precision machining of the ball-pocket center lines so that they intersect the race rotation axis 35 may be relaxed or even dispensed with. A further cage feature, the inner diameter relief 29 may be dispensed with if the corresponding bearing inner race land is relieved to allow the returning moment to be effective.

Thus, the many design concepts described above can be embodied in bearings of varied designs, sizes and for varied applications and environments and these concepts can be employed in varied combinations. Therefore, while the invention has been described in its preferred embodiment, it is to be understood that the words and terms employed are for descriptive purposes rather than limitive purposes and that many changes within the purview of the appended claims may be made without departing from the true scope and spirit of the invention in its broader aspects.

I claim:

1. An anti-friction bearing assembly for supporting a rotatable member for rotating about an axis in a support member, the combination comprising,
   an outer bearing ring having outer bearing race and land portions,
   an inner bearing ring having inner bearing race and land portions,
   a plurality of rotatable elements therebetween and in normal rolling contact with said races, and
   a generally cylindrical bearing cage between said rings having a corresponding plurality of generally radially extending pockets for controlling the relative angular positions of said rotatable members, said rotatable elements normally producing in operation a corresponding plurality of radial inertial forces on said outer bearing ring, said forces normally tending to vary in a random manner in accordance with random variations in the element positions within said cage pockets,
   said bearing cage having a mass center of gravity that is eccentric to said rotation axis for producing, in operation, a centrifugal force radially displacing said cage between said bearing rings such that a point surface thereof contacts a land portion of one of said bearing races and thereby maintains said cage in predetermined substantially constant position relative to said one race whereby to maintain its radial inertial force vector substantially constant and predictable.

2. The bearing assembly as set forth in claim 1 wherein said cage comprises a generally cylindrical member having radially offset inner and outer diameters for producing said mass eccentricity relative to said support axis.

3. The bearing assembly as set forth in claim 1 wherein said mass eccentricity is of a magnitude such that the resultant cage radial inertial force vector is greater than the sum of all element-to-pocket contact forces.

4. The bearing assembly as set forth in claim 3 wherein said cage contacts a land portion of said inner race.

5. The bearing assembly as set forth in claim 3 wherein said rotating elements are balls and wherein said cage ball pockets are generally cylindrically shaped.

6. The bearing assembly as set forth in claim 5 wherein the cage pockets for predetermined ones of said elements are circumferentially positioned such that components of their associated radial inertial force vectors substantially balance said cage centrifugal force vector.

7. The ball bearing assembly as set forth in claim 5 wherein the axes of said cylindrical ball pockets intersect at the cage rotation axis for reducing ball/pocket contact forces upon said cage radial displacement.

8. The ball bearing assembly as set forth in claim 5 wherein said bearing is of the angular contact, preloaded type and wherein said bearing cage includes a further mass eccentricity about a cage diameter substantially normal to the direction of said cage radial force vector for tilting said cage about said normal diameter and for maintaining said balls in predetermined substantially constant and predictable positions within said pockets and thereby their radial inertial force vectors substantially constant and predictable.

9. The ball bearing assembly as set forth in claim 8 wherein said cage includes steps in its opposite faces such that said cage is mass unbalanced about said normal cage diameter.

10. The ball bearing assembly as set forth in claim 9 wherein said cage internal diameter adjacent one of said cage faces is greater than the internal diameter adjacent the other of said cage faces whereby the said contact point is on said cage lesser internal diameter and contacts but one of said internal race land portions to thereby produce a tilting force on said cage about a diameter normal to said cage radial force vector.

11. The ball bearing assembly as set forth in claim 8 wherein said cage is radially displaced in a direction normal to said first mentioned cage displacement thereby to produce a centrifugal force component normal thereto and wherein the cage pockets for other predetermined ones of said balls are circumferentially positioned such that components of their associated radial inertial force vectors substantially balance said normal centrifugal force component vectors.

12. The ball bearing assembly as set forth in claim 11 wherein said circumferential positions of both sets of ball pockets for said predetermined balls includes the effects of those components of the radial inertial forces of the remainder of said balls produced by the components of both of said cage radial displacements.

* * * * *